United States Patent [19]

Mangnall

[11] Patent Number: 4,853,006
[45] Date of Patent: Aug. 1, 1989

[54] LIQUID DEAERATING APPARATUS

[75] Inventor: Keith Mangnall, Bolton, United Kingdom

[73] Assignee: Hick, Hargreaves & Company Limited, United Kingdom

[21] Appl. No.: 206,104

[22] Filed: Jun. 13, 1988

[30] Foreign Application Priority Data

Oct. 21, 1987 [GB] United Kingdom ............... 8724610

[51] Int. Cl.⁴ .............................................. B01D 19/00
[52] U.S. Cl. ............................................ 55/185; 55/55; 55/189; 55/194
[58] Field of Search ............... 55/55, 87, 178, 186, 55/187, 189, 194, 185

[56] References Cited

U.S. PATENT DOCUMENTS 4,565,634  1/1986  Lydersen ............................. 55/55 X

FOREIGN PATENT DOCUMENTS 0476611  2/1973  U.S.S.R. ............................. 55/187
1175522  8/1985  U.S.S.R. ............................. 55/189
 638627  6/1950  United Kingdom .
 837510  6/1960  United Kingdom .
2061755  5/1981  United Kingdom ................. 55/194
2157587  5/1988  United Kingdom .

Primary Examiner—Charles Hart
Attorney, Agent, or Firm—Pravel, Gambrell, Hewitt, Kimball & Krieger

[57] ABSTRACT

A liquid deaerating apparatus comprises a deaerating tank housing a spray-type deaerator. The latter has a spray nozzle means for spraying the liquid to be deaerated horizontally against a surrounding liquid spray impingement absorbing and contacting means. Below the latter there is disposed packed bed means through which the liquid passes to a collection area within the deaerating tank. The packed bed through which the liquid percolates to the collection area comprises a high flow rate system to assist such downward flow of the liquid and release of air and gas.

6 Claims, 1 Drawing Sheet

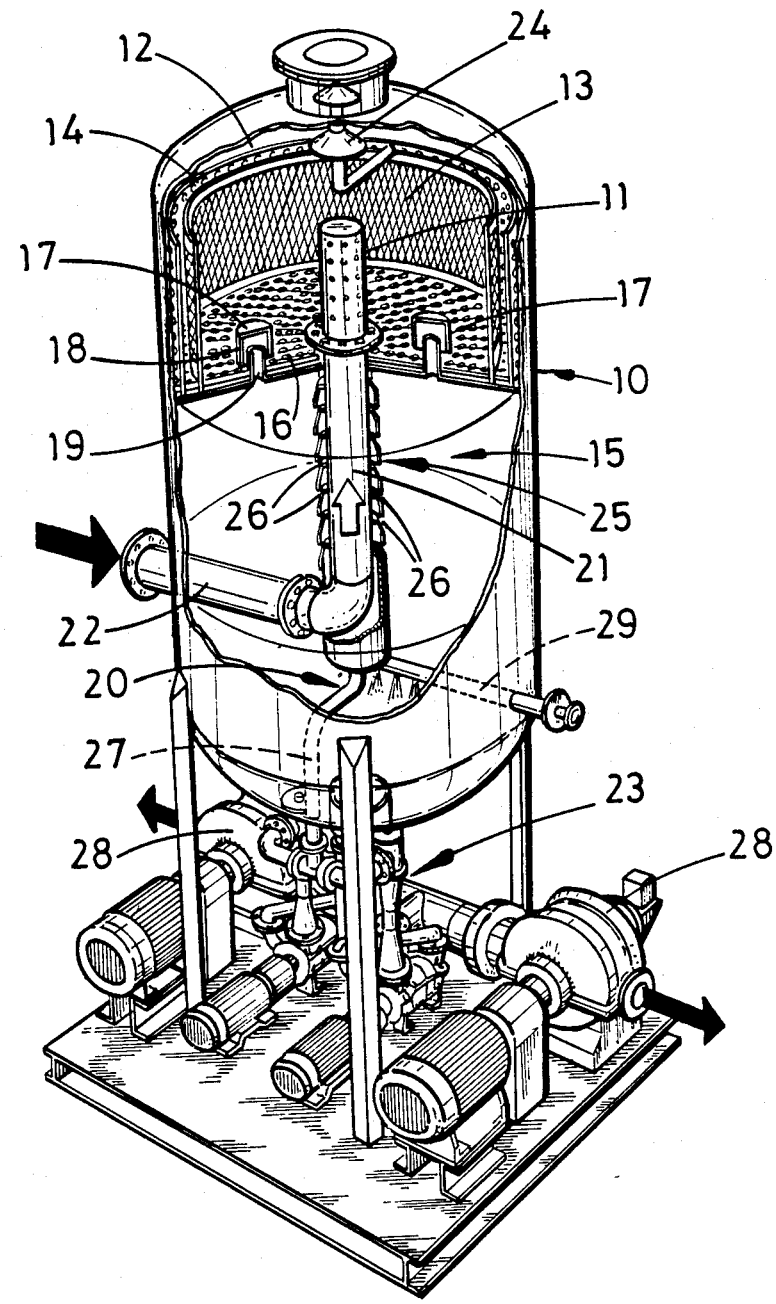

LIQUID DEAERATING APPARATUS

This invention relates to liquid deaerating apparatus and it is an object of the present invention to provide a single stage deaerating apparatus which, inter alia, is of reduced height and weight compared with existing operationally-equivalent deaerating apparatus.

According to the present invention there is provided a liquid deaerating apparatus comprising a deaerating tank housing a spray-type deaerator having spray nozzle means for spraying the liquid to be deaerated horizontally against a surrounding liquid spray impingement absorbing and contacting means below which is disposed packed bed means through which the liquid passes to a collection area within the deaerating tank.

Preferably the packed bed through which the liquid percolates to the collection area comprises a high flow rate system to assist such downward flow of the liquid and release of air and gas.

A liquid, for example seawater, supply is connected to the spray nozzle means, and perferably comprises a vertical pipe traversing the packed bed.

A vacuum applying and maintaining system is connected to the deaerating tank and preferably comprises a vacuum applying plant associated with an air, gas and water vapour extraction pipe surrounding the liquid inlet pipe and open to the packed bed. Preferably also the extraction pipe is connected to a top vent above the spray nozzle means.

An embodiment of the present invention will now be described, by way of example, with reference to the accompanying drawing which is a fragmentary perspective view of a seawater deaerating apparatus.

The deaerating apparatus comprises a vertical tank 10 in the upper part of which is a spray deaerator comprising a centrally-located vertical nozzle system 11 from which seawater is horizontally sprayed. Horizontal spraying compared with vertical spraying enables a larger volume of seawater to be effectively available for gas release. "Gas" as hereinafter used means, inter alia, air and water vapour.

The spray deaerator also comprises, surrounding the spray nozzle system 11, a spray liquid absorbing and contacting coalescer 12 comprising an inner annular mesh wall 13 and an outer annular perforated plate wall 14 spaced from the inner wall 13.

A packed bed 15 is provided below the spray nozzle system 11 and coalescer 12 and an orifice distribution system 16 which maintains an even flow of water over the packed bed 15.

At the top of the packed bed 15 there is provided a plurality of down-comers 17 (two being shown), each of which comprise an outer tube 18 open at the bottom and closed at the top and spaced above the top perforated plate 16 and an inner open-ended tube 19 extending through the top perforated plate 16 into the packed bed 15. These tubes 18, 19 act as balancing overflow vents in the case of a single stage deaerator as illustrated, and as overflow seals in the case of two-stage deaerators as is disclosed in our Patent Application No. 84 10471 filed Apr. 24, 1984.

It is to be noted that the coalescer 12 gives added mass transfer characteristic to the deaerator and that the horizontal spray system 11 is unaffected by the foaming propensity of the seawater.

The packed bed 15 and down-comers 17 construction provides for uniform flow through the plate perforations or orifices whereby a maximum packing performance at minimum pressure loss is achieved.

Seawater is supplied to the spray nozzle 11 by a vertical supply pipe 21 which extends centrally up through the packed bed 15 and which is fed from a supply (not shown) by a horizontal branch pipe 22.

The deaerating apparatus comprises a vacuum applying and maintenance plant 23 which continuously extracts gas freed by the deaerating process from the tank 10. Initial gas release is through a top vent 24 connected to a pipe 25 surrounding the seawater supply pipe 21 and open to the packed bed 15 as indicated at 26. The pipe 25 is connected to the vacuum plant 23 by pipeline 27.

The gas is thus concurrently withdrawn as the water percolates through the packed bed 15 thus giving an uprated deaeration performance. Water extraction pumps 28 continuously remove the treated water from the tank 10 to the process system.

A delivery pipe for adding a scavenger to the treated water is indicated at 29.

It is to be clearly understood that the abovedescribed single stage deaerating apparatus is readily adaptable to provide a two stage operational system.

I claim:

1. A liquid deaerating apparatus comprising a deaerating tank housing a spray-type deaerator having spray nozzle means for spraying the liquid to be deaerated horizontally against a surrounding liquid spray impingement absorbing and contacting means below which is disposed packed bed means though which the liquid passes to a collection area within the deaerating tank, and vacuum applying and maintaining system is connected to the deareating tank and comprises a vacuum applying plant associated with an air, gas and water vapour extraction pipe surrounding the liquid inlet pipe and open to the packed bed.

2. A liquid deaerating apparatus as claimed in claim 1, in which the extraction pipe is connected to a top vent above the spray nozzle means.

3. A liquid deaerating apparatus comprising
   a deaerating tank;
   a spray-type deaerator disposed within the deaerating tank, said spray-type deaerator including a spray nozzle means for horizontally spraying the liquid to be deaerated;
   liquid spray impingement absorbing and contacting means surrounding said spray-type deaerator and against which the liquid to be deaerated is horizontally sprayed;
   packed bed means disposed below said liquid spray impingement absorbing and contacting means and through which the liquid passes to a lower collection area within said deaerating tank;
   liquid delivery pipe means traversing said packed bed means and connected to said spray nozzle means; and
   a vacuum applying and maintaining system connected to said deaerating tank by an air, gas, water vapour extraction pipe means which surrounds said liquid delivery pipe means and which is open to said packed bed means.

4. A liquid deaerating apparatus as claimed in claim 3 wherein said extraction pipe means is connected to a top vent in said deaerating tank above said spray nozzle means.

5. A liquid deaerating apparatus as claimed in claim 3 wherein said packed bed comprises a high flow rate system to assist downward flow of the liquid and release of air and gas.

6. A liquid deaerating apparatus as claimed in claim 3 comprises a seawater supply connected to the liquid delivery pipe means.

* * * * *